US008203625B2

(12) United States Patent
Furuya et al.

(10) Patent No.: US 8,203,625 B2
(45) Date of Patent: Jun. 19, 2012

(54) IMAGE CAPTURE DEVICE WHICH SELECTS READING METHOD BASED ON SENSITIVITY INFORMATION

(75) Inventors: Shinji Furuya, Osaka (JP); Eiji Anno, Nara (JP); Yuichi Suzuki, Osaka (JP); Tomoaki Tsutsumi, Osaka (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 12/503,914

(22) Filed: Jul. 16, 2009

(65) Prior Publication Data

US 2010/0013956 A1      Jan. 21, 2010

(30) Foreign Application Priority Data

Jul. 18, 2008   (JP) ................................. 2008-186942

(51) Int. Cl.
| H04N 5/235 | (2006.01) |
| H04N 5/222 | (2006.01) |
| H04N 3/14  | (2006.01) |
| G03B 15/02 | (2006.01) |
| G03B 15/03 | (2006.01) |
| G03B 9/70  | (2006.01) |

(52) U.S. Cl. .................. 348/229.1; 348/230.1; 348/371; 348/308; 348/294; 396/61; 396/176; 396/173; 396/171

(58) Field of Classification Search .................. 348/371, 348/224.1, 229.1, 132, 579, 294, 302–312, 348/230.1; 396/61, 171–181
See application file for complete search history.

(56) References Cited

U.S. PATENT DOCUMENTS

| 6,031,248 A | 2/2000 | Mei et al. |
| 2005/0068435 A1 | 3/2005 | Shigemori et al. |
| 2005/0128328 A1* | 6/2005 | Kakumoto et al. ........... 348/308 |
| 2005/0264688 A1* | 12/2005 | Ouchi ........................... 348/371 |
| 2007/0133974 A1* | 6/2007 | Murakami et al. ............ 396/157 |

FOREIGN PATENT DOCUMENTS

| JP | 6-009265 | 2/1994 |
| JP | 09-205518 | 8/1997 |
| JP | 2000-031453 | 1/2000 |

(Continued)

OTHER PUBLICATIONS

Notice of Reasons for Rejection for corresponding Japanese Application No. 2009-166662 issued Sep. 14, 2010 with English translation.

(Continued)

*Primary Examiner* — Lin Ye
*Assistant Examiner* — Marly Camargo
(74) *Attorney, Agent, or Firm* — Renner, Otto, Boisselle & Sklar, LLP (57) ABSTRACT

An image capture device according to the present invention includes: an optical system for producing a subject's image; an imager with multiple photodiodes, which reads an electrical signal representing the intensity of light that has been incident on each photodiode from the photodiode, thereby generating an image signal representing the subject's image; a controller, which acquires sensitivity information by photometry in order to adjust the sensitivity of the imager to light and which selects one of multiple methods for reading the electrical signal from each photodiode according to the sensitivity information acquired; and a driver for driving the imager by the reading method selected. The multiple reading methods include a mixing reading method, by which the electrical signals supplied from the photodiodes are added together and then output.

7 Claims, 7 Drawing Sheets

FOREIGN PATENT DOCUMENTS

| | | |
|---|---|---|
| JP | 2000-506354 | 5/2000 |
| JP | 2002-142151 | 5/2002 |
| JP | 2005-109993 | 4/2005 |
| JP | 2005-117187 | 4/2005 |
| JP | 2005-167497 | 6/2005 |
| JP | 2005-176081 | 6/2005 |
| JP | 2007-163561 | 6/2007 |
| WO | 97/34256 | 9/1997 |

OTHER PUBLICATIONS

Co-pending U.S. Appl. No. 13/054,183 submitted on Jan. 14, 2011.

* cited by examiner

| ISO SENSITIVITY (CALCULATED) | PIXEL MIXING | INCREASE IN GAIN BY AGC |
|---|---|---|
| 100 | NO | 100 |
| 800 | NO | 800 |
| 1000 | NO | 1000 |
| 1001 | 9Mix | 100 |
| 1250 | 9Mix | 139 |
| 1600 | 9Mix | 178 |
| 2000 | 9Mix | 222 |
| 2500 | 9Mix | 278 |
| 3200 | 9Mix | 356 |

IMAGE CAPTURE DEVICE WHICH SELECTS READING METHOD BASED ON SENSITIVITY INFORMATION

BACKGROUND OF THE INVENTION

1. Field of the Invention

The present invention relates to an image capture device such as a digital still camera or a digital movie camera.

2. Description of the Related Art

A conventional image capture device is disclosed in Japanese Patent Application Laid-Open Publication No. 2007-163561.

The image capture device includes a means for setting a flash-ON sequential shooting mode and a switching means for switching the imager reading methods into a pixel mixing drive when the flash-ON sequential shooting mode is selected. In this manner, in performing sequential shooting with the flash fired, this image capture device compensates for the lack of quantity of light received by the imagers and increases the read rate of the imagers.

Meanwhile, there is also an image capture device that regulates the amplification gain in such a flash-ON sequential shooting mode. In order to compensate for the lack of quantity of light received by the imagers, the amplification gain is added to an amplifier means for amplifying the image signals that have been generated by the imagers.

To keep the sequential shooting speed equal to or higher than a predetermined value when the sequential shooting is carried out with the flash fired, the maximum intensity of the flash light to be fired while the sequential shooting is actually carried out could be defined to be lower than that of the flash light to be fired while the subject is shot only once (which will be referred to herein as "single shooting").

In that case, however, when the sequential shooting is carried out with the flash fired, the intensity of the flash light to be fired every time the subject is actually shot would decrease so much that the imaging means such as the imagers should have their sensitivity to light increased significantly. That is to say, to compensate for the lack of light of the imaging means, the image capture device should increase the amplification gain of the amplifier means significantly. Such a significant increase in the amplification gain of the amplifier means, however, would cause a steep decrease in the signal to noise ratio (SNR) of the image signal that has been output from the imaging means and then amplified.

On the other hand, the imaging means could also have its sensitivity to light increased significantly in accordance with the user's settings. In that case, the amplification gain of the amplifier means should also be increased too much that the SNR of the image signal that has been output from the imaging means and then amplified would decrease steeply.

Furthermore, even when the image capture device has a mode of automatically setting the shooting conditions, the imaging means could also have its sensitivity to light increased significantly. Then, the amplification gain of the amplifier means should also be increased so significantly that the image signal would have a steeply decreased SNR when output from the imaging means and amplified.

It is therefore an object of the present invention to provide an image capture device that can generate an image signal with reduced noise while taking the resolution into account even when its imager needs to have its sensitivity to light increased.

SUMMARY OF THE INVENTION

An image capture device according to the present invention includes: an optical system for producing a subject's image; an imager with multiple photodiodes, which reads from the photodiode an electrical signal representing the intensity of light that has been incident on each of the multiple photodiodes, thereby generating an image signal representing the subject's image; a controller, which acquires sensitivity information by photometry in order to adjust sensitivity of the imager to light and which selects a reading method from multiple methods for reading the electrical signal from the multiple photodiodes according to the sensitivity information acquired; and a driver for driving the imager according to the reading method selected. The multiple reading methods include a mixing reading method, by which the electrical signals supplied from the photodiodes are added together and then output.

In one preferred embodiment, the multiple reading methods may include a standard reading method, by which the electrical signals supplied from the respective photodiodes are output without being added together. The controller may select either the standard reading method or the mixing reading method.

In another preferred embodiment, the image capture device may further include an amplifier for amplifying the image signal generated with a set of amplification gains. The controller may set one of the amplification gains according to the sensitivity information acquired. After one of the amplification gains has been set, the driver may drive the imager, thereby getting the image signal generated by the imager.

In this particular preferred embodiment, the image capture device may be operable to define the respective numbers of pixels of the image signals generated by the standard and mixing reading methods to be equal to each other.

In a specific preferred embodiment, the image capture device may further include an image processor for performing image compression or expansion on the image signal that has been amplified. The image processor may cut down the number of pixels of the image signal generated by the standard reading method to that of the image signal generated by the mixing reading method.

In an alternative preferred embodiment, the image capture device may further include an image processor for either cutting down the number of pixels of the image, or performing interpolation, on the image signal that has been amplified. If the image signal has been generated by the standard reading method, the image processor may cut down the number of pixels of the image signal. But if the image signal has been generated by the mixing reading method, the image processor may perform interpolation on the image signal to increase its number of pixels.

In yet another preferred embodiment, the image capture device may be operable to define the respective numbers of pixels of the image signals generated by the standard and mixing reading methods to be different from each other.

In yet another preferred embodiment, the image capture device may further include a flash operable to fire in order to ensure sufficient light for shooting. If shooting sessions need to be sequentially performed a number of times with the flash fired, the controller may perform photometry with the flash fired preliminarily before the shooting sessions are started, thereby acquiring the sensitivity information. And the controller may select either the standard reading method or the mixing reading method according to the sensitivity information acquired.

In yet another preferred embodiment, the controller may select the mixing reading method if the sensitivity information is equal to or greater than a threshold value but may select the standard reading method if the sensitivity information is less than the threshold value.

In yet another preferred embodiment, only when the image capture device is instructed to operate in a particular mode, the controller may determine, according to the sensitivity information acquired, which of multiple reading methods should be taken to read the electrical signal from the multiple photodiodes.

The image capture device of the present invention selects one of multiple reading methods, including a mixing reading method, according to the given sensitivity information, and drives its imager by that selected method. As a result, even when the sensitivity of the imager needs to be increased significantly, an image signal with reduced noise can also be generated with the resolution taken into account.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of an image capture device according to the present invention will be described with reference to the accompanying drawings.

Figure 1:
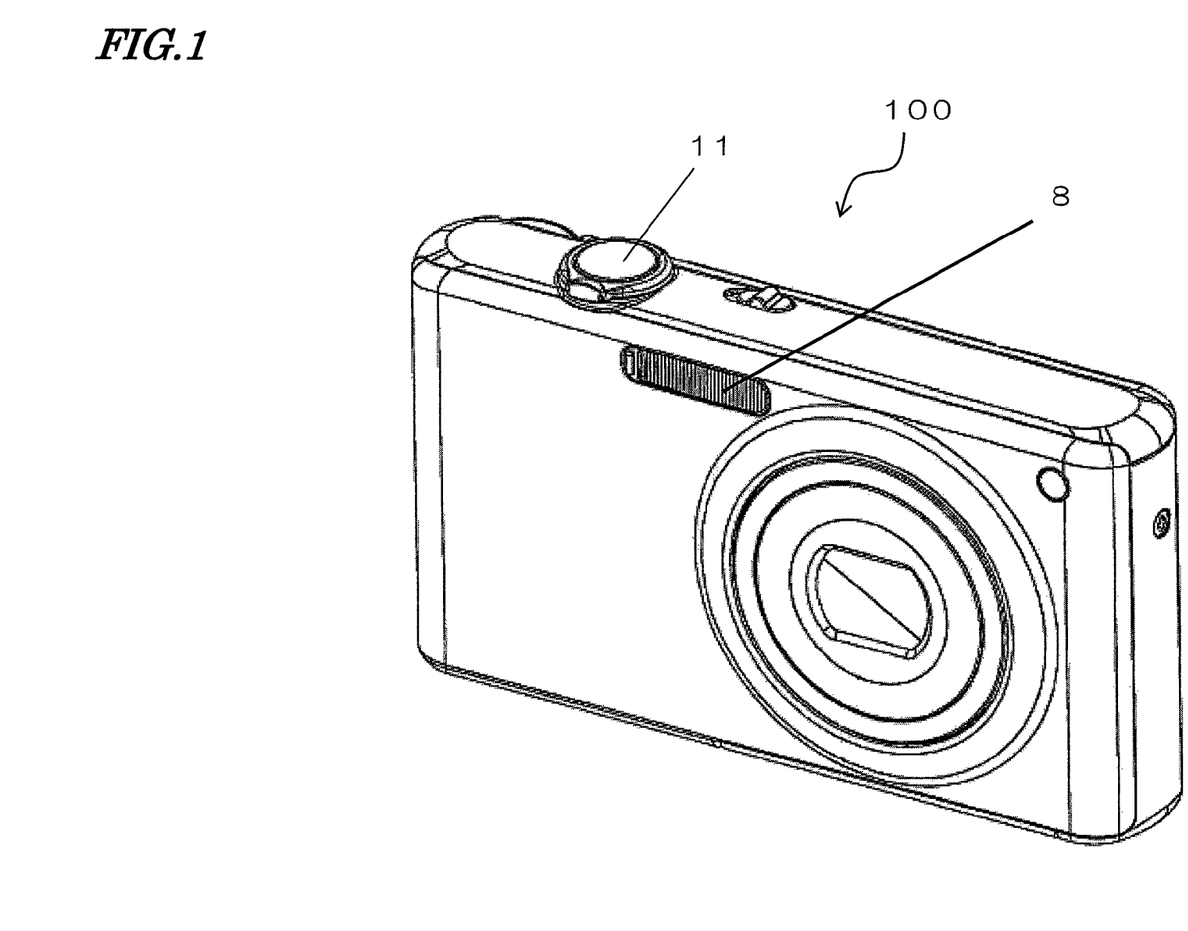
FIG. 1 illustrates the general appearance of a digital camera 100 as a specific preferred embodiment of the present invention.
Figure 2:
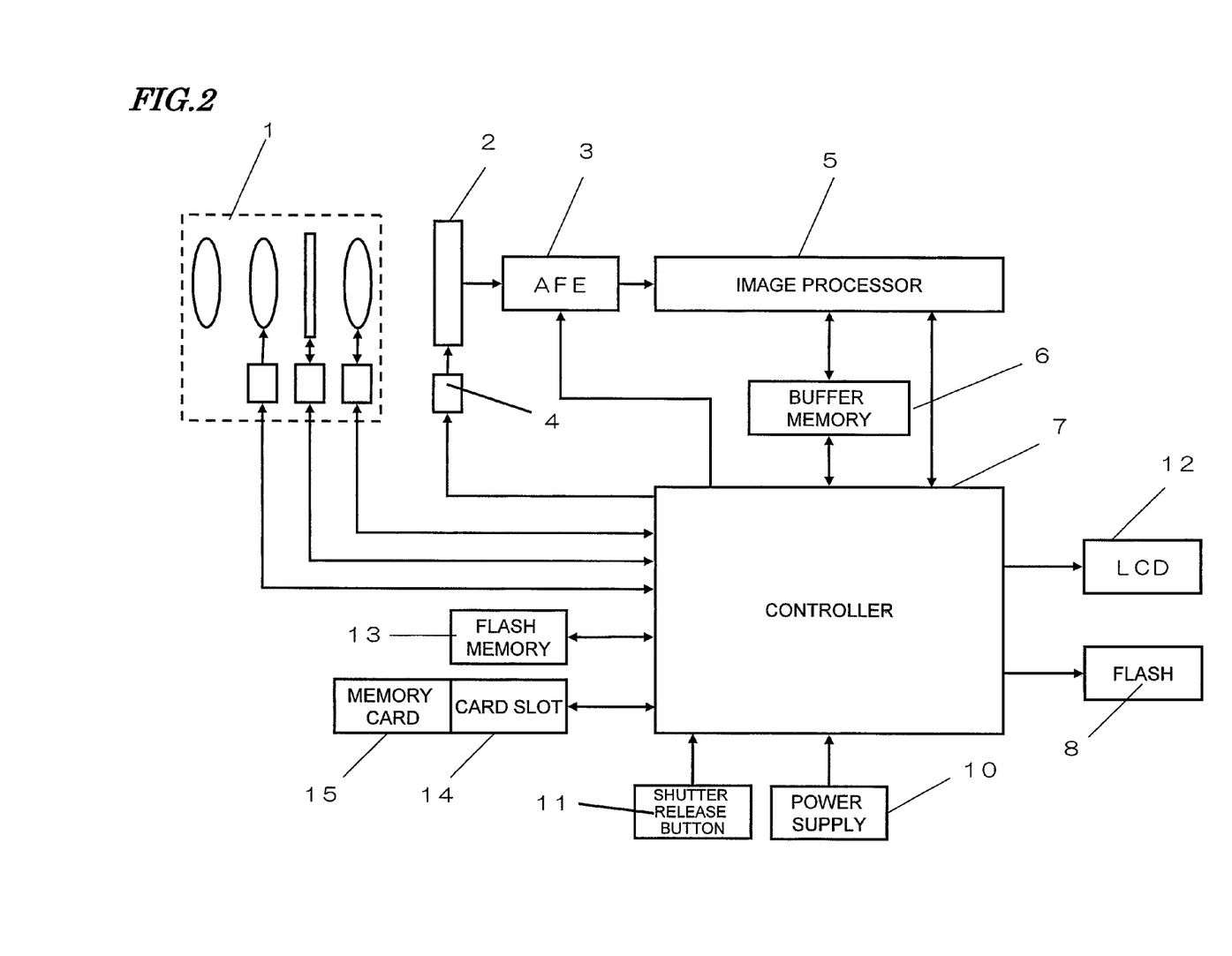
FIG. 2 illustrates the internal configuration of the digital camera 100.

1. How the Digital Camera 100 of this Preferred Embodiment Operates in Principle FIG. 1 illustrates the general appearance of a digital camera 100 as a specific preferred embodiment of the present invention, while FIG. 2 illustrates the internal configuration of the digital camera 100. Hereinafter, it will be described with reference to FIGS. 1 and 2 how this digital camera 100 operates in principle.

When the user presses down a shutter release button 11 fully, the digital camera 100 of this preferred embodiment accepts it as his or her instruction to start shooting. In accordance with a single instruction to start shooting, this digital camera 100 can sequentially perform a number of shooting sessions with the flash fired for actual exposure (which will be referred to herein as "main flashing"). As is well known in the art, the "flash" is a light emitting member to be used for ensuring a sufficient amount of light for shooting.

However, before starting the sequential shooting sessions with the flash 8 fired for actual exposure, the digital camera 100 fires the flash 8 preliminarily (which will be referred to herein as "preliminary flashing"). And during this preliminary flashing, the controller 7 performs a photometry process on the light that has been reflected from the subject. The photometry process may be carried out based on the light that has been incident on a CCD sensor 2 (to be described later) or on a dedicated photometric sensor.

Based on the result of this photometry process, the digital camera 100 acquires the sensitivity information (which will be referred to herein as "ISO sensitivity") of a CCD image sensor 2 (which is also called as "an imager" and which will be simply referred to herein as a "CCD") during the main flashing, thereby setting shooting conditions according to the ISO sensitivity acquired. Examples of the shooting conditions include an intensity of the flash light emitted by the flash 8 during the main flashing, a method of reading out a pixel signal from the CCD 2, and an amplification gain of an analog front end (which will be abbreviated herein as "AFE") 3. In accordance with these shooting conditions determined, the digital camera 100 controls the flash 8, the CCD driver 4, and/or the AFE 3.

Following the instruction given by the controller 7, the CCD driver 4 controls the method of reading out a pixel signal from the CCD 2. Then, the digital camera 100 controls the flash 8 and the CCD driver 4, thereby getting shooting sessions done sequentially with the main flashing. The CCD driver 4 drives the CCD 2 so as to make the CDD 2 generate an image signal. As used herein, "to drive the CCD 2" means supplying power to the CCD 2 to read a signal and performing a readout control to read an electrical signal representing the intensity of the light from a particular line of photodiodes among a huge number of photodiodes on the CCD 2.

The digital camera 100 can control the flash 8 and the CCD driver 4 so that the shooting sessions are sequentially done with the main flashing. The image signal generated by the CCD 2 is converted into image data by the AFE 3 and the image processor 5. Then, the controller 7 stores the image data thus obtained in a memory card 15. In this manner, the digital camera 100 can get sequential shooting done with the main flashing.

Also, after the flash 8 has been fired preliminarily, the digital camera 100 detects the voltage value of a capacitor used in the flash 8 and stores the voltage value in a buffer memory 6. After that, the digital camera 100 fires the flash 8 for the main flashing the first time. As a result, the CCD 2 receives the incoming light, converts an analog signal representing the intensity of the light received into a digital signal, and then outputs it as image data. In this manner, the first shooting session is done.

Then, the digital camera 100 charges the capacitor (not shown) in the flash 8 based on the voltage value stored in the buffer memory 6. And when the capacitor is charged to the initially detected value, the digital camera 100 fires the flash 8 for the main flashing the second time and gets the second shooting session done using the CCD 2.

2. Configuration of Digital Camera 100

Next, the general appearance of the digital camera 100 and the respective components thereof will be described with reference to FIGS. 1 and 2 again.

As shown in FIG. 2, the optical system 1 includes various optical elements and components for driving those optical elements. For example, the optical system 1 may include a focus lens, a zoom lens, a diaphragm and an actuator for driving these elements.

The light collected by the optical system 1 is incident on the CCD 2, which includes a number of photodiodes and receives the incoming light at the photodiodes. In response, each of those photodiodes transforms the incoming light into an electrical signal representing its intensity. An image signal is generated based on the electrical signals that have been generated by those photodiodes. It is controlled by the CCD driver 4 how to read out the electrical signals from the CCD 2.

The image signal generated by the CCD 2 is input to the AFE 3, which has various components and performs multiple functions using them. For example, the AFE 3 may include an AGC (automatic gain control) amplifier, a CDS (correlated double sampling) circuit, and an A/D converter (none of which is shown). The image signal is amplified by the AGC amplifier, which is supposed to amplify the image signal with the amplification gain that has been determined by the controller 7. The CDS circuit reduces the noise components of the image signal. And the A/D converter converts the image signal supplied from the AGC (as an analog signal) into a digital signal and outputs it as image data.

The image processor 5 subjects the image data that has been converted into a digital signal by the AFE 3 to image processing. Examples of such image processing may include, but are not limited to, gamma transformation, YC conversion, electronic zooming, compression, and expansion. Then, the image processor 5 stores the image data that has been subjected to the image processing in the buffer memory 6. The image data stored in the buffer memory 6 is converted into a display image by the image processor 5 and then presented on an LCD 12.

The flash 8 may include a xenon lamp and a capacitor (neither is shown). The capacitor stores the electrical charge supplied from a power supply 10. The flash 8 releases the electrical charge stored in the capacitor and applies a voltage to the xenon lamp, thereby flashing the xenon lamp.

In a situation where a shooting session needs to be performed with the flash 8 ON, when sensing the user press down the shutter release button 11 fully, the controller 7 not only fires the flash 8 but also drives the CCD driver 4. At this point in time, the controller 7 supplies a pulse signal to the flash 8 for a main flashing. On the other hand, in a situation where a shooting session needs to be performed with the flash 8 OFF, when sensing the user press down the shutter release button 11 fully, the controller 7 drives the CCD driver 4 without firing the flash 8.

The controller 7 stores the image data, represented by the image signal that has been generated by the CCD 2, in either a flash memory 13 or the memory card 15 loaded in a card slot 14.

2-1. Various Controls Performed by Controller 7

In a situation where a shooting session needs to be performed with the flash 8 ON, after having sensed the user press down the shutter release button 11 fully, the controller 7 controls the flash 8 to fire preliminarily. The preliminary flash light is emitted with a predetermined intensity (e.g., at a guide number (GN) of 0.7). During the preliminary flashing, the controller 7 controls the CCD driver 4 so that the CCD 2 generates an image signal. In this case, an ISO 100 converted amplification gain is supposed to be defined for the AGC of the CCD 2. As a result, the controller 7 acquires image data based on the image signal. Then, based on the image data thus obtained, the controller 7 measures the intensity of the light that has been reflected from the subject during the preliminary flashing. Also, based on the information about luminance that has been obtained by getting the image data subjected to the YC conversion by the image processor 5, the controller 7 calculates the intensity of the reflected light. In that case, the controller 7 calculates the intensity of the reflected light by working out the average of luminance values within a photometric range defined in a portion of the image data. Such an operation is called a "photometry". As the F number and the shutter speed to be set during the preliminary flashing, values that are stored beforehand in the flash memory 13 may be used.

And based on the intensity of this reflected light, the controller 7 determines the intensity of light during the main flashing (which will be referred to herein as a main flash light). In this preferred embodiment, to get sequential shooting sessions done at a high rate, a GN of 2.0 is set as the maximum intensity of the main flash light. However, the maximum intensity does not have to be this value but could also be defined in advance or specified by the user.

Hereinafter, it will be described how to calculate the intensity of the main flash light.

First of all, the controller 7 calculates an appropriate intensity of the main flash light (which will be referred to herein as an "appropriate main flash light GN") without taking the maximum intensity of the flash light into account.

According to this preferred embodiment, by reference to the table that defines the relation between the intensity of the reflected light during the preliminary flashing and the appropriate main flash light GN, the appropriate main flash light GN is obtained based on the intensity of the reflected light. In this case, the table tabulates the relation between the intensity of the reflected light and the main flash light GN in a situation where the sensitivity of the CCD 2 is set to be ISO 100. Specifically, in the table, multiple values are listed as the intensities of reflected light and associated with respective main flash light GNs. That is to say, the table associates the main flash light GNs with the intensities of the reflected light in the descending order. For example, main flash light GN #1, #2 and #3 are associated with the reflected light intensities #1, #2 and #3, respectively.

Following table 1 shows an example of the above table. The table may be stored with the other table shown in FIG. 3 (to be described later) in an internal buffer of controller 7 (not shown) or flush memory 13, for example. Note that, since values which correspond to the intensities of the reflected light can be specified in accordance with an output of CCD 2 implemented, presentation of specific values is omitted herein.

TABLE 1

| Reflected light intensity #1 | GN1 |
|---|---|
| Reflected light intensity #2 | GN2 |
| Reflected light intensity #3 | GN3 |
| ... | ... |

Reflected light intensities: #1 > #2 > #3 > ...

By reference to that table, the controller 7 calculates the appropriate main flash light GN. Specifically, first of all, the controller 7 detects the intensity of the reflected light. And if the controller 7 has found an exactly matching reflected light intensity on the table, then the controller 7 simply retrieves its associated main flash light GN. On the other hand, if the controller 7 has found no matching reflected light intensities on the table, then the controller 7 performs a linear interpolation on two closest reflected light intensities on the table, which are respectively higher and lower than the reflected light intensity detected, and their associated main flash light GNs, thereby calculating an appropriate main flash light GN. For example, if the reflected light intensity detected is between the reflected light intensities #2 and #3 mentioned above, then the controller 7 performs a linear interpolation on the reflected light intensity #2, which is closest to, and higher than, the reflected light intensity detected, and its associated main flash light GN #2, and the reflected light intensity #3, which is closest to, and lower than, the reflected light intensity detected, and its associated main flash light GN #3, thereby calculating the best main flash light GN.

If the appropriate main flash light GN thus calculated is smaller than the maximum value of the main flash light GN, the controller 7 stores the former main flash light GN as the intensity of the main flash light in the buffer memory 6. On the other hand, if the appropriate main flash light GN thus calculated is greater than the maximum value, then the controller 7 stores the maximum value as the intensity of the main flash light in the buffer memory 6.

For example, if the appropriate main flash light GN is 1.9, then the intensity of the main flash light should have a GN of 1.9. On the other hand, if the appropriate main flash light GN is 2.9, then the intensity of the main flash light should have a GN of 2.0. According to this preferred embodiment, the image capture device is designed such that lights during a multiple times of main flashing have the same intensity.

Also, if the appropriate main flash light GN is greater than the maximum intensity, then the controller 7 adjusts the ISO sensitivity of the CCD 2 by controlling the CCD 2 and the AFE 3. This adjustment is done in order to control the brightness of the image captured with the ISO sensitivity of the CCD 2 for the excess of the appropriate main flash light GN over the maximum value. Specifically, the ISO sensitivity may be adjusted in the following manner.

In this preferred embodiment, the rate of increase or decrease in ISO sensitivity (ISO/100) is calculated by the following Equation (1):

$$\text{Rate of increase or decrease in ISO sensitivity} = ((\text{appropriate main flash light GN})/(\text{maximum main flash light GN}))^2 \quad (1)$$

Then, according to this rate of increase or decrease in ISO sensitivity, the controller 7 determines what ISO sensitivity ISO 100 should be changed to. For example, if the appropriate main flash light GN is 4.0 and if the maximum main flash light GN is 2.0, then the rate of increase or decrease in ISO sensitivity is 4.0. In this example, since the ISO sensitivity during the preliminary flashing is ISO 100, the ISO sensitivity of the CCD 2 during the main flashing should be ISO 400.

According to the ISO sensitivity thus calculated, the controller 7 controls the CCD 2 and the AFE 3 during the main flashing. The controller 7 may store the table shown in FIG. 3, for example. By reference to the table with the ISO sensitivity calculated, the controller 7 determines whether the image signal should be read by either a pixel mixing reading method (e.g., 9-pixel mixing according to this preferred embodiment) or a standard reading method with no pixel mixing, and also determines how much the AGC gain should be increased. Using these tables and values, the controller 7 controls the CCD 2 and the AFE 3.

Figure 3:
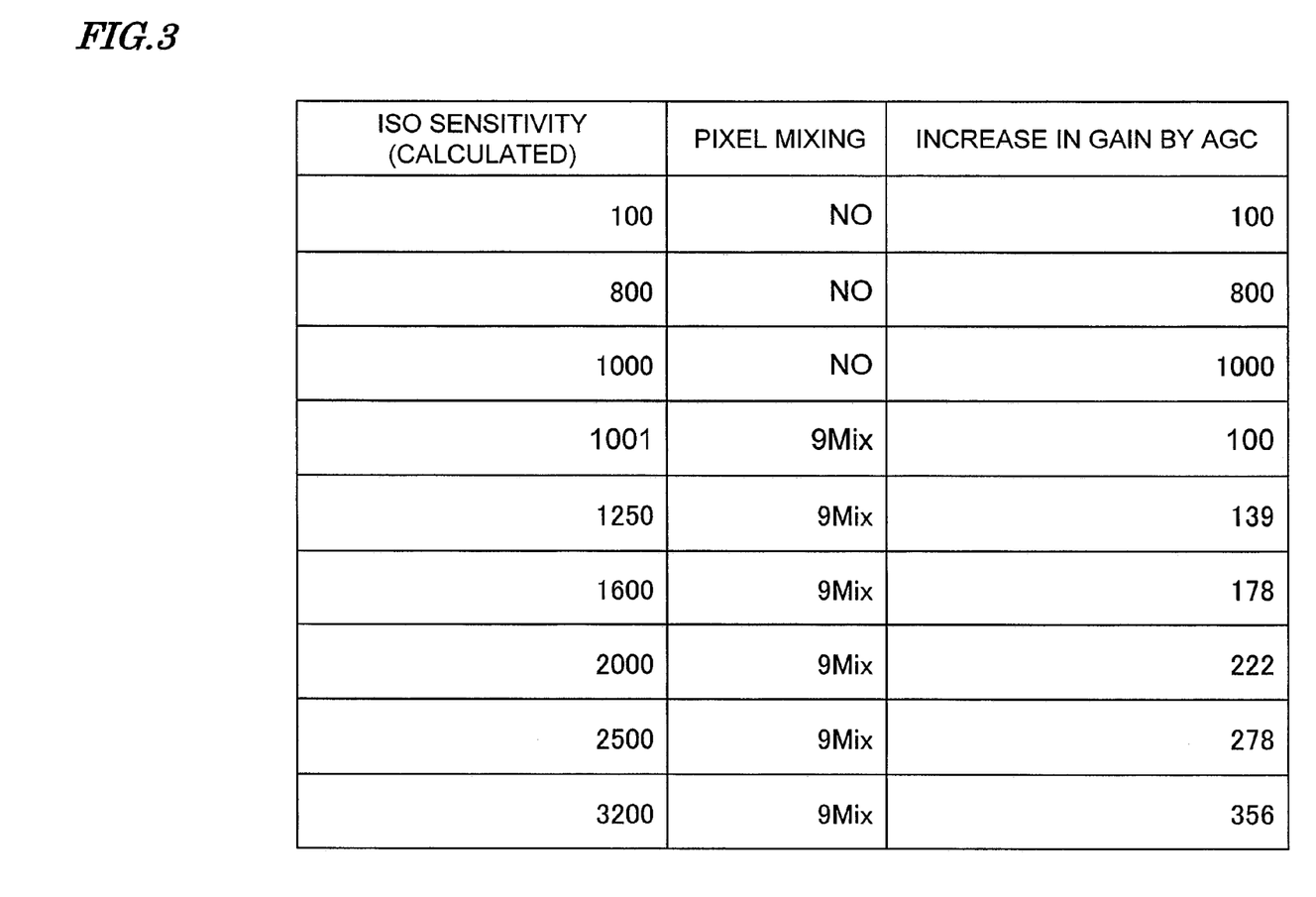
FIG. 3 is a table defining a correlation between the ISO sensitivity, the need of pixel mixing processing, and the increase in gain by an AGC.

For example, if the ISO sensitivity calculated is ISO 800, the controller 7 may adopt a standard driving method with no pixel mixing as the method of reading out an image signal from the CCD 2 and may set the amplification level of the AFE 3 to a value associated with ISO 800. On the other hand, if the ISO sensitivity calculated is ISO 1,600, the controller 7 may adopt a pixel mixing driving (e.g., 9-pixel mixing) as the method of reading an image signal from the CCD 2 and may set the amplification level of the AFE 3 to a value associated with ISO 178.

The amplification levels that are not listed on the table may be calculated by linear interpolation. As for the reading method, if the ISO sensitivity is equal to or higher than ISO 1001 that is a threshold value, the pixel mixing driving may be adopted. On the other hand, if the ISO sensitivity is less than ISO 1001 (i.e., equal to or lower than ISO 1000), then the standard driving method (i.e., every pixel reading driving) may be adopted. That is to say, a threshold value may be set to determine whether the reading method should be pixel mixing reading or standard reading and may be stored in either the controller 7 or the flash memory 13.

Optionally, the table shown in FIG. 3 could be stored in the flash memory 13, too. Note that it is not essential to use table of FIG. 3. Controller 7 may select pixel mixing reading or standard reading and decide how much the AGC gain should be only by calculation.

Hereinafter, it will be described how the pixel mixing driving may get done as being applied to the nine pixel mixing described above. First of all, suppose the CCD 2 has multiple types of pixel groups. As used herein, the "multiple types of pixel groups" refer to pixel groups, of which the photoelectric conversion abilities have mutually different sensitivity properties according to the wavelength of the incoming light. For example, those pixel groups may include a group of pixels with red (R) sensitivity property (sensitivity to red (R)), a group of pixels with green (G) sensitivity property (sensitivity to green (G)), and a group of pixels with blue (B) sensitivity property (sensitivity to blue (B)).

The CCD 2 can read pixel signals that have been generated by those multiple types of pixel groups independently of each other. As a result, image signals are obtained and images (or frames) are generated on a sensitivity property basis.

As an example, it will be described how to carry out pixel mixing driving on red (R). The CCD 2 adds together the pixel signals representing nine red (R) pixels, which are arranged as a three (horizontal) by three (vertical) matrix, and outputs the sum as a pixel signal representing a single pixel. As a result, even if the intensity of the light falling on the entire CCD 2 is low, an intensity that is high enough for a single pixel can still be ensured. Nevertheless, since a pixel signal representing a single pixel is formed of the nine pixels yet to be subjected to the pixel mixing driving, the resolution will decrease to one-third both vertically and horizontally.

It should be noted that such a pixel mixing technique that uses nine pixels is just an example. Alternatively, four, sixteen or six pixels could be used as well. Also, the number of horizontal pixels does not always have to be the same as, but may be different from, that of vertical pixels.

Furthermore, although a group of pixels with the red (R) sensitivity property has been described as an example, the same processing will be performed on the green (G) and blue (B) pixels as well.

Figure 4:
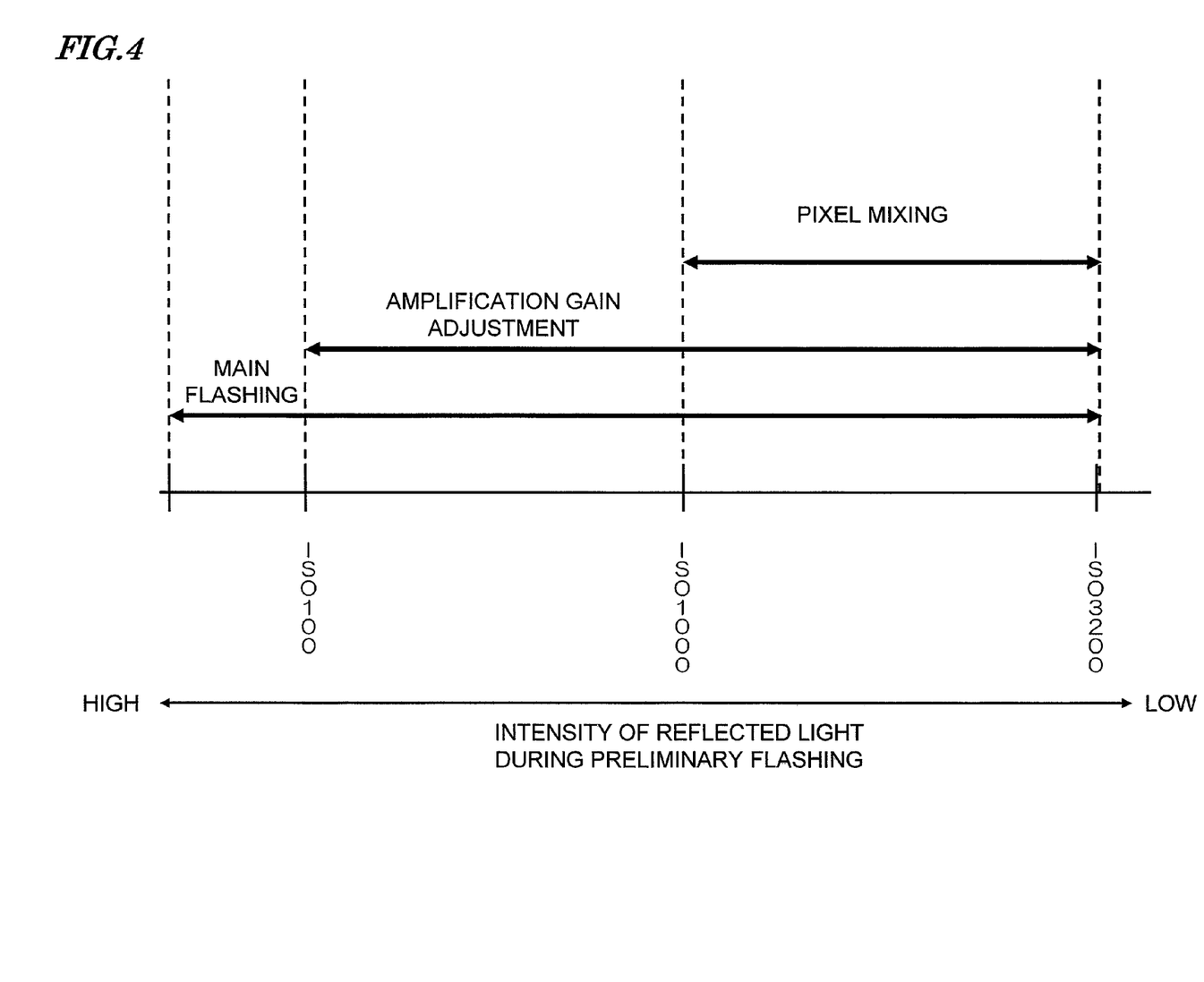
FIG. 4 shows ISO sensitivities at which gain adjustment processing and pixel mixing processing are carried out.

According to this preferred embodiment, if the intensity of the reflected light during the preliminary flashing is high, the digital camera 100 will adjust the intensity of the main flash light to cope with that as shown in FIG. 4. Meanwhile, as the intensity of the reflected light during the preliminary flashing decreases, the digital camera 100 not only adopts the intensity of the main flash light as the maximum value but also adjusts the ISO sensitivity of the CCD 2. In that case, while the ISO sensitivity is still low, the digital camera 100 adjusts the amplification gain of the AFE 3. However, as the ISO sensitivity increases, the digital camera 100 not only adjusts the amplification gain of the AFE 3 but also changes the methods of reading the pixels of the CCD 2. As a result, if the ISO sensitivity of the CCD 2 is low, the digital camera 100 performs a control operation so as to generate an image signal with non-decreased resolution from the CCD 2. On the other hand, if the ISO sensitivity of the CCD 2 is high, then the digital camera 100 performs a control operation so as to generate an image signal with high sensitivity from the CCD 2. Since the amplification can be done by the AFE 3 within a smaller range, the CCD 2 can generate an image signal with reduced noise while taking the resolution into consideration.

Thereafter, the controller 7 detects the voltage value of the capacitor in the flash 8. In the example illustrated in FIG. 5, the voltage value detected at a time T1, when the preliminary flashing is done, is 270 V. Then, the controller 7 stores that voltage value detected in the buffer memory 6.

Figure 5:
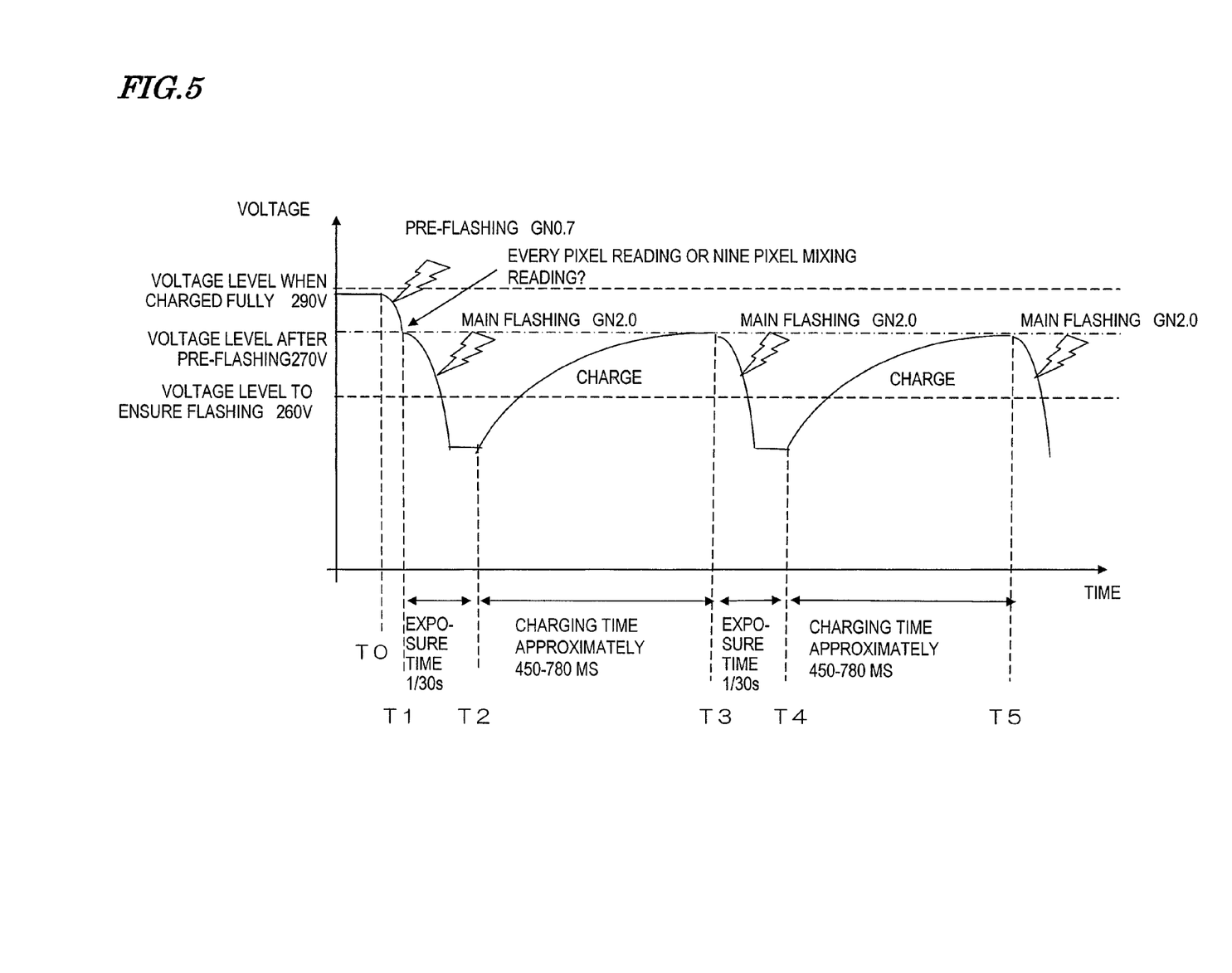
FIG. 5 shows a variation in the voltage value of the capacitor of a flash.

After that, the controller 7 instructs the flash 8 to emit the main flash light and drives the CCD driver 4, thereby making the CCD 2 generate an image signal. In this case, the controller 7 controls the flash 8 and drives the CCD driver 4 without a break, thereby getting the sequential shooting done with the flash 8 ON.

In the example illustrated in FIG. 5, the digital camera 100 starts the main flashing as soon as the preliminary flashing gets done at the time T1. This is done to eliminate a shuttering time lag by starting the shooting right after the preliminary flashing is finished. In a situation where such a shuttering time lag is permitted, however, the voltage level may be restored to a full charge level of 290 V again when the preliminary flashing gets done, and then the main flash light may be emitted.

2-2. How to Control Respective Sections when Sequential Shooting is Performed with Main Flashing The controller 7 not only instructs the flash 8 to emit the main flash light but also drives the CCD driver 4, thereby getting the sequential shooting done with the main flash light emitted. Hereinafter, it will be described exactly how to get these operations done.

Specifically, the controller 7 controls the flash 8 so that the flash 8 emits the main flash light based on the intensity of the main flash light that is stored in the buffer memory 6. In this case, the main flash light can be emitted based on the intensity of the main flash light by changing the pulse signals to be supplied to the flash 8.

Furthermore, the controller 7 also drives the CCD driver 4 to make the CCD 2 generate an image signal, while making the flash 8 emit the main flash light. Then the controller 7 instructs the AFE 3 to generate image data in the digital form. The image processor 5 subjects the digitized image data to image processing and then stores it in the buffer memory 6. Then, the controller 7 writes the image data that has been stored in the buffer memory 6 on the memory card 15.

Thereafter, to get the next main flash light emitted, the controller 7 controls the power supply 10 so that electrical charge is supplied to the flash 8. On sensing that the voltage value of the flash 8 has reached the voltage value stored in the buffer memory 6 due to the supply of the electrical charge from the power supply 10, the controller 7 gets the supply of the electrical charge from the power supply 10 to the flash 8 stopped.

Then, the controller 7 controls the flash 8 to get the next main flash light emitted. Also, the controller 7 drives the CCD driver 4, thereby making the CCD 2 generate an image signal. And then the controller 7 writes the image data that has been digitized by the AFE 3 and then subjected to the image processing by the image processor 5 on the memory card 15.

The intensity of the main flash light to be emitted for the second time and on is the same as that of the main flash light that has been emitted previously. And the voltage value of the capacitor charged is approximately the same as the voltage value when the main flash light was emitted the last time. That is why the pulse signal representing the intensity of the main flash light (i.e., a signal to be input to fire the flash) is also the same.

It should be noted that the intensity of the flash light emitted should be adjusted according to the voltage value of the capacitor during the flashing. Suppose a voltage of 100 V should be applied to emit flash light with certain intensity when the capacitor has a voltage value of 270 V. In that case, to achieve the same flash light intensity even when the capacitor has a voltage value of 170 V, not a voltage of 100 V but a voltage of approximately 110 V should sometimes be applied. That is to say, it should be calculated how much voltage should be applied to achieve the flash light intensity required. This is because the processing of changing the pulse signals according to the voltage value of the capacitor is so complicated that it would take a lot of time and trouble to program such processing in advance.

For that reason, if the voltage value of the capacitor from the second main flashing on is regulated to be approximately the same as the one during the previous main flashing as is done in this preferred embodiment, then there is no need to change the pulse signals anymore. In other words, there is no need to calculate the pulse signals (or the duration of the flashing in Japanese Patent Application Laid-Open Publication No. 2007-163561) using a correction coefficient and regulate the voltage as shown in FIG. 5 of Japanese Patent Application Laid-Open Publication No. 2007-163561. As a result, a memory to store the correction coefficient and the resources of the device that would otherwise be allocated for that purpose can be saved.

The processing described above is carried out continuously while the shutter release button 11 is pressed down fully or until a predetermined number of image shots have been taken.

2-3. How Image Data to be Recorded Changes Depending on Whether Pixel Mixing Driving is Adopted or Not As described above, according to this preferred embodiment, the CCD 2 is supposed to change the methods of reading an image signal according to the ISO sensitivity calculated. Hereinafter, it will be described how the image data to be recorded changes depending on whether the pixel mixing driving is adopted or not. Under the control of the CCD driver 4, the CCD 2 operates while switching between the pixel mixing reading mode and the every pixel reading mode. The CCD 2 is supposed to be an imager with nine mega (approximately nine million) effective pixels. In the following description, "mega" will refer to either the number of effective pixels of the CCD or the number of pixels of an image shot with the CCD, not the data size of the image data.

First of all, it will be described what image data will be generated unless the pixel mixing driving is adopted. In that case, first, the CCD 2 reads the image signal from multiple pixels as it is. That is why the image signal to be output from the CCD 2 will have approximately nine million pixels. The AGC amplifier of the AFE 3 amplifies that image signal with a preset amplification gain, which is an amplification level that has been defined by the controller 7. Thereafter, the A/D converter of the AFE 3 digitizes the amplified image signal. Specifically, the AFE 3 outputs the image data to the image processor 5, which subjects the image data to image processing, thereby compressing the image data to three mega pixels. As used herein, the "compression" refers to pixel thinning processing. Then, the controller 7 writes the image data that has been subjected to that image processing on the memory card 15.

Next, it will be described what image data will be generated if the pixel mixing driving is adopted. In that case, first, when reading image signals from multiple pixels, the CCD 2 mixes image signals from pixels representing the same color. As described above, according to the pixel mixing of this preferred embodiment, three horizontal pixels by three vertical pixels (i.e., nine pixels in total) are mixed together for each of the three primary colors of R, G and B. Image signals that have been mixed together in this manner are output from the CCD 2. Consequently, the image signals output from the CCD 2 have approximately one million (i.e., one mega) pixels, which is one-ninth of the number of pixels of the image signals to be output when no pixel mixing driving is adopted. The output image signals of the CCD 2 are amplified and digitized by the AFE 3 and then output as image data. Then, the image processor 5 subjects the image data supplied from the AFE 3 to image processing. In that case, the image processor 5 not only rearranges the R, G and B pixels into a desired order but also increases the number of pixels by interpolation so that the image data with one mega pixels comes to have three mega pixels. In this case, any of various known interpolation methods such as bi-cubic method and bilinear method could be adopted.

According to the processing method just described, the number of pixels is supposed to be increased by performing interpolation on the image that has been obtained by the pixel mixing reading method. However, interpolation does not always have to be performed. Unless interpolation is carried out, the image that has been obtained without performing the pixel mixing reading may be compressed so that the number of its pixels is reduced from nine mega pixels to one mega pixels. Speaking more generally, the image obtained without performing the pixel mixing reading may be compressed to have the smallest number of pixels to be obtained by the pixel mixing reading.

By unifying the numbers of pixels of the images generated into three mega pixels as described above, this image capture device will come in handier for the user when he or she needs to sort out, view or edit the image data afterward. Particularly for a user who is not used to operating the digital camera 100, he or she would find it troublesome if the numbers of pixels (i.e., the image sizes) changed every shooting session. That is why it would be useful to unify those numbers of pixels.

Meanwhile, it is also possible to let the number of pixels of the image generated change depending on whether the pixel mixing reading is adopted or not. For example, the image generated with the pixel mixing reading could have 1M (one mega) pixels and the image generated without the pixel mixing reading could have 9M pixels. In that case, even though the numbers of pixels are not unified, an image with high resolution can always be obtained.

Then, the controller 7 writes the image data that has been subjected to such image processing on the memory card 15. It should be noted that the pixel mixing method described above is just an example and any other pixel mixing driving technique could also be adopted as well.

According to the preferred embodiment described above, the number of pixels of the image data to be recorded is supposed to remain the same (e.g., 3M pixels), no matter whether the pixel mixing method is adopted or not. However, the present invention is in no way limited to that specific preferred embodiment. Optionally, the number of pixels of the image data to be recorded could also change depending on whether the pixel mixing is adopted or not.

4. Operation

Figure 6:
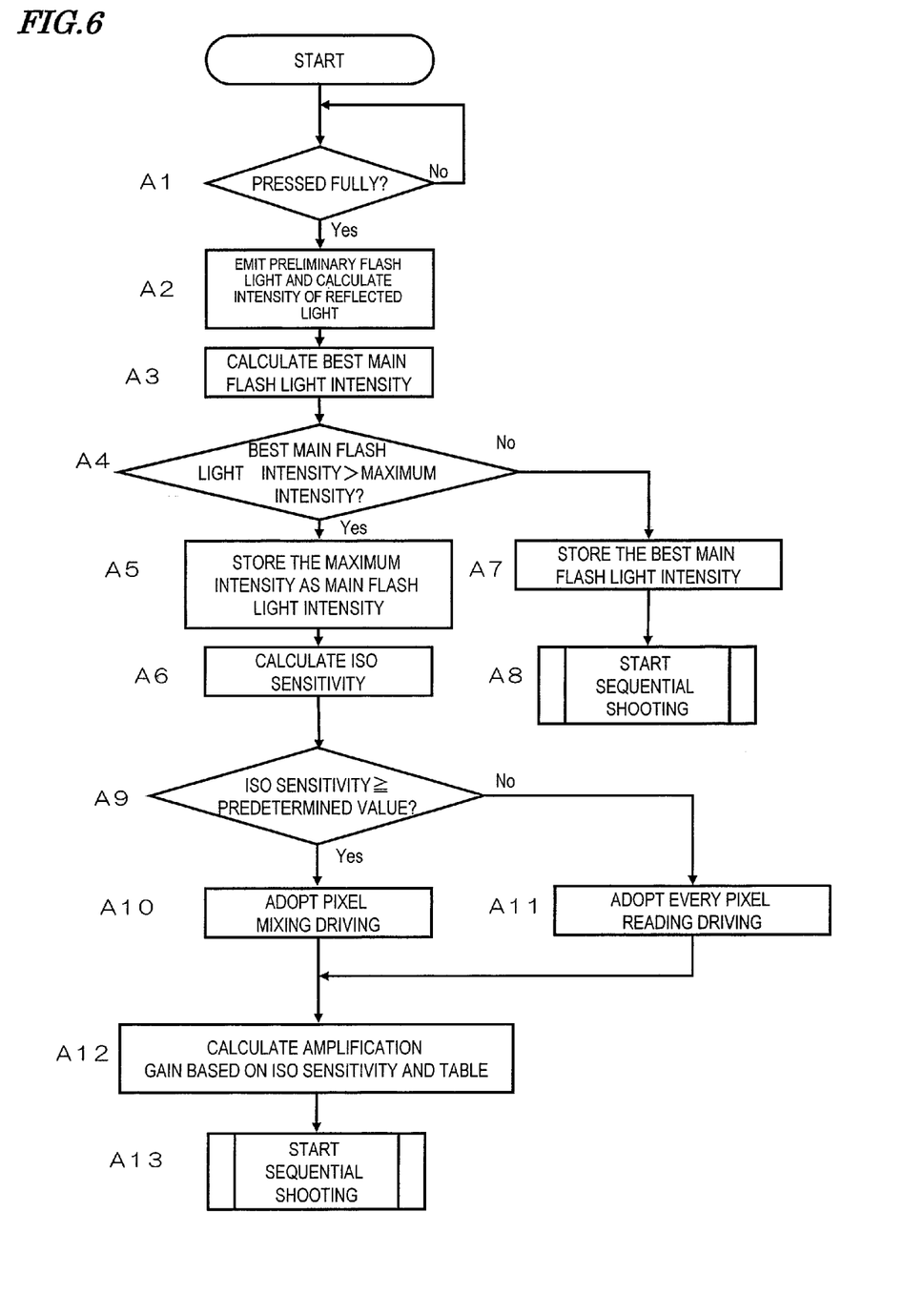
FIGS. 6 and 7 are flowcharts showing the procedure of processing to be done by the digital camera 100.
Figure 7:
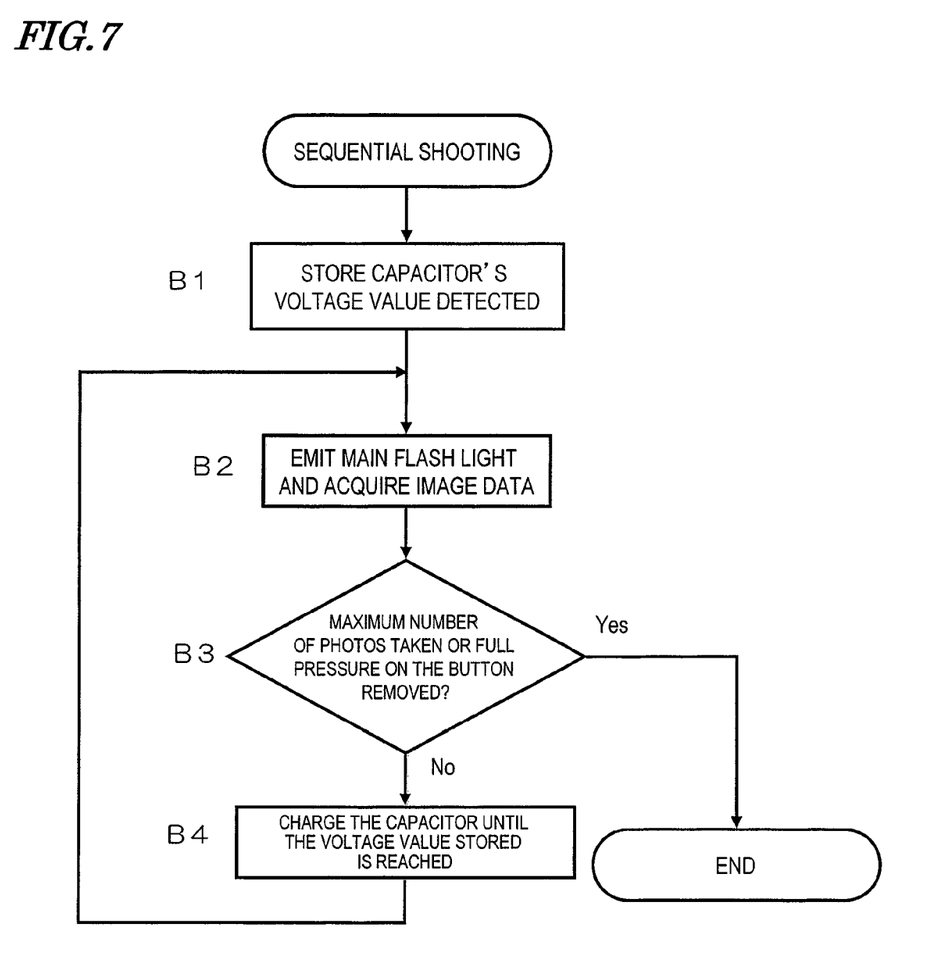

Hereinafter, it will be described with reference to the flowcharts shown in FIGS. 6 and 7 how the digital camera 100 with such a configuration operates. The digital camera 100 will operate as described below after the power of the digital camera 100 has been turned from OFF into ON and if the mode of operation of the digital camera 100 is set to be flash-ON sequential shooting mode. It should be noted that the digital camera 100 is designed so as to select one of multiple modes including the flash-ON sequential shooting mode. Also, according to this preferred embodiment, if the flash-ON sequential shooting mode is selected, the amplification gain of the AGC amplifier is set to be an amplification level associated with the ISO 100.

First of all, the controller 7 determines whether or not the shutter release button 11 has been pressed down fully in Step A1. If the answer is YES, the controller 7 instructs the flash 8 to emit preliminary flash light in Step A2. Meanwhile, the controller 7 also drives the CCD driver 4, thereby acquiring image data based on the image signal supplied from the CCD 2. And then based on the image data acquired, the controller 7 calculates the intensity of the light reflected from the subject during the preliminary flashing in Step A2.

Next, in Step A3, the controller 7 calculates the best intensity of the main flash light based on the intensity of the reflected light obtained. Then, in Step A4, the controller 7 determines whether or not the best main flash light intensity calculated is greater than the value that has been stored as the maximum intensity.

If the answer to the query of Step A4 is NO (i.e., if the best intensity of the main flash light is equal to or smaller than the maximum intensity), then the controller 7 stores the best intensity of the main flash light that has been calculated in the previous processing step A3 as the main flash light intensity in the buffer memory 6 (in Step A7). After that, the controller 7 starts the sequential shooting operation shown in FIG. 7 (in Step A8).

On the other hand, if the answer to the query of Step S4 is YES (i.e., if the best intensity of the main flash light is greater than the maximum intensity), then the controller 7 stores the intensity of the main flash light that has been stored as the maximum value as the main flash light intensity in the buffer memory 6 (in Step A5). Next, based on the best main flash light intensity calculated, the controller 7 calculates the ISO sensitivity of the CCD 2 during the main flashing.

Subsequently, the controller 7 determines in Step A9 whether or not the ISO sensitivity thus calculated is equal to or greater than a predetermined sensitivity. If the answer is YES, the controller 7 adopts the pixel mixing driving as the method of reading an image signal for the CCD 2 (in Step A10). On the other hand, if the ISO sensitivity is less than the predetermined sensitivity, then the controller 7 adopts a standard every pixel reading driving method, not the pixel mixing driving, as the method of reading out an image signal from the CCD 2 (in Step A11). In these processing steps A10 and A11, the controller 7 defines the reading method for the CCD 2 by controlling the CCD driver 4.

After having performed the processing step A10 or A11, the controller 7 calculates an amplification gain based on the ISO sensitivity obtained in the processing step A6 and the table shown in FIG. 3 and sets the gain for the AFE 3 (in Step A12). Thereafter, the controller 7 starts the sequential shooting operation shown in FIG. 7 (in Step A13).

Hereinafter, the sequential shooting operation shown in FIG. 7 to be started in the processing step A8 or A13 will be described.

First, the controller 7 detects the voltage value of the capacitor in the flash 8 that has been fired preliminarily, and then stores information about the voltage value detected in the buffer memory 6 (in Step B1).

Next, the controller 7 instructs the flash 8 to emit main flash light based on the main flash light intensity stored in the buffer memory 6. Meanwhile, the controller 7 also drives the CCD driver 4, thereby making the CCD 2 generate an image signal and acquiring image data based on the image signal generated by the CCD 2. And then the controller 7 stores the image data on the memory card 15 (in Step B2).

Subsequently, the controller 7 determines whether or not the maximum allowable number of photos have been taken yet as the image data and whether or not the full pressure on the shutter release button 11 has been removed yet (in Step B3). If the answer is YES (i.e., if the maximum allowable number of photos have already been taken as the image data or if the pressure on the shutter release button 11 has already been removed completely), then the sequential shooting operation ends.

On the other hand, if the maximum allowable number of photos have not been taken as the image data yet and if the pressure on the shutter release button 11 has not quite been removed yet, then the controller 7 supplies electrical charge from the power supply 10 to the capacitor of the flash 8 until the voltage value stored in the buffer memory 6 is reached (in Step B4). After that, the process goes back to the processing step B2 and the sequential shooting operation is repeatedly performed with the flash ON until the answer to the query of the processing step B3 becomes YES.

Hereinafter, it will be described with reference to FIG. 5 how the voltage value varies in the capacitor.

First, on sensing the shutter release button 11 be pressed down fully (at a time T0), the controller 7 supplies a pulse signal representing the GN to the flash 8 to fire the flash 8 for the preliminary flashing. In response, the flash 8 emits a quantity of electrical charge as defined by the pulse signal (in the period from the time T0 through a time T1). When the preliminary flashing is completed, the controller 7 determines, according to the ISO sensitivity calculated, whether the every pixel reading or the pixel mixing reading should be adopted as the driving method, and makes settings to use the reading method selected (at the time T1). Thereafter, to get the main flash light emitted without charging, the controller 7 supplies a pulse signal, representing the intensity (GN) of the main flash light, to the flash 8. In response, the flash 8 emits a quantity of electrical charge as defined by the pulse signal (in the period from the time T1 through the end of the electrical charge emission). In this case, since the controller 7 makes the CCD 2 perform an exposure process by driving the CCD driver 4, the controller 7 will not start controlling the flash 8 until the CCD 2 finishes the exposure process (in the period from the end of the electrical charge emission through a time T2). On sensing the CCD 2 finish the exposure process, the controller 7 instructs the power supply 10 to supply electrical charge to the flash 8 (at the time T2). And on finding that the voltage value of the flash 8 has reached the stored voltage value, the controller 7 stops charging (at a time T3). Then, the controller 7 supplies a pulse signal representing the intensity (GN) of the main flash light to the flash 8 to emit the next main flash light. In response, the flash 8 emits a quantity of electrical charge as defined by the pulse signal (in the period from the time T3 through the end of the electrical charge emission). In this period, the same operation is carried out as in the period from the time T1 through the time T2. After that, the same processing will be carried out repeatedly, and the description thereof will be omitted herein.

According to this preferred embodiment, the controller 7 of the digital camera 100 selects one of multiple reading methods, including the mixing reading, according to the ISO sensitivity and can drive the CCD 2 by the selected method. Thus, the digital camera can get an image signal generated by the CCD with the noise reduced and with the resolution taken into account.

In another preferred embodiment of the present invention, the digital camera 100 includes: a flash 8 that stores electrical charge in itself and emits the electrical charge stored, thereby irradiating a subject with main flash light; a CCD 2 for capturing a subject's image that has been produced by an optical system 1 and generating an image signal; and a controller 7 that makes the CCD 2 generate multiple image signals sequentially by having the flash 8 emit main flash light a number of times with the same intensity each time, detects the quantity of electrical charge stored in the flash 8 before the flash 8 is made to emit the main flash light for the first time, and changes the quantities of electrical charge supplied to the flash 8 according to the quantity of electrical charge detected when the flash 8 is made to emit the main flash light for the second time after having been made to emit the main flash light for the first time.

The digital camera 100 changes the quantities of electrical charge supplied to the flash 8 according to the quantity of electrical charge detected in the controller 7 until the flash 8 is made to emit the main flash light the next time. That is to say, when making the flash 8 emit the main flash light for the second time, the controller 7 substantially equalizes the quantity of electrical charge stored in the flash 8 with the quantity during the first main flashing. As a result, the digital camera 100 does not have to calculate a pulse signal to make the flash emit the main flash light at the same intensity, otherwise that calculation would have to be done if the quantities of electrical charge stored in the flash were different.

Hereinafter, another preferred embodiment of the present invention will be described as a modified example of the preferred embodiment that has already been described.

In the preferred embodiments described above, a CCD image sensor is supposed to be used as an exemplary imaging means. However, this is just an example. Alternatively, the imaging means could also be a CMOS image sensor. In that case, the power dissipation could be cut down.

Also, in the preferred embodiments described above, the emission means is supposed to be a flash. However, the present invention is in no way limited to that specific preferred embodiment. Alternatively, an LED flash could also be used.

Also, in the preferred embodiment described above, the ISO sensitivity is supposed to be determined by the intensity of the reflected light that has been detected during the preliminary flashing. However, this is just an example. Alternatively, the ISO sensitivity may also be determined in accordance with the user's command that has been entered through an interface such as some keys or buttons (like cross arrow keys) on the camera. In other words, the user may set the ISO sensitivity of the digital camera by operating such an interface. In response, the controller is given the ISO sensitivity that he or she has chosen and determines, according to the ISO sensitivity selected, which pixel reading method should be adopted for the CCD.

Furthermore, according to the preferred embodiment described above, the CCD is supposed to change the pixel reading methods during the main flashing. However, the present invention is in no way limited to that specific preferred embodiment. Optionally, even an image signal supplied continuously from the CCD (i.e., an image signal representing a through-the-lens image on the LCD) may also be generated with the pixel reading methods changed.

Also, in the preferred embodiment described above, the appropriate main flash GN (i.e., the intensity of the main flash light) is supposed to be obtained by reference to the table. However, this is just an example. Alternatively, the intensity of the main flash light could also be calculated by some equation that is used generally.

Furthermore, in the preferred embodiment described above, the rate of increase or decrease in ISO sensitivity (ISO/100) is supposed to be calculated by Equation (1). However, the present invention is in no way limited to that specific preferred embodiment. If necessary, the rate of increase or decrease in ISO sensitivity could also be obtained by any other method.

Also, in the preferred embodiment described above, the capacitor is supposed to be charged in the interval between the emissions of main flash light based on the voltage value of the capacitor that has been detected after the preliminary flashing. However, the present invention is in no way limited to that specific preferred embodiment. Alternatively, a predetermined voltage value (of 270 V, for example) could be stored in a flash memory 13, which is an exemplary storage medium, and the capacitor could also be charged between the emissions of main flash light based on the predetermined voltage value stored. There is no need to detect the voltage value of the capacitor after the preliminary flashing.

In that case, if the voltage value of the capacitor during the first main flashing is predictable, then the voltage value can be approximately the same when the main flash light is emitted next time. As a result, there is no need to calculate any pulse signals during the next main flashing. The voltage value of the capacitor during the first main flashing is predictable in a situation where the GN of the preliminary flash light has been defined as a predetermined value with no shooting control performed or in a situation where the digital camera is designed so as to be able to charge the capacitor fully in a predetermined amount of time (e.g., 10 seconds), for example.

In the preferred embodiments described above, the decision whether to perform pixel mixing or not is supposed to be made according to the sensitivity information only when the flash-ON sequential shooting mode is selected. However, this is only an example. Alternatively, it may also be determined, according to the sensitivity information, whether the pixel mixing should be done or not in any other shooting mode. Nevertheless, if the decision whether or not to perform the pixel mixing is made according to the sensitivity information only in a particular shooting mode such as the flash-ON sequential shooting mode but if no such decisions are made in any other mode as in the preferred embodiment described above, then the following effect will be achieved. Specifically, in that particular mode, the image capture device will operate with the SNR of the colors of the image captured taken into account. But in another mode, the image capture device will operate with a higher priority put on the resolution of the image captured. That is to say, the user can get an image captured with the color SNR increased in a certain mode and with the resolution increased in another mode.

That is to say, the present invention is in no way limited to those specific preferred embodiments described above but may be modified in numerous ways and may assume many embodiments other than those specifically described above.

For example, if the controller 7 described above is implemented as a microcomputer, the processing that has been described above with reference to the flowcharts of the accompanying drawings could be implemented as a computer program to be executed by the microcomputer. Such a computer program may be circulated on the market by being stored on a storage medium such as a CD-ROM or downloaded over telecommunications lines such as the Internet.

The present invention is applicable to various kinds of image capture devices including digital still cameras, digital movie cameras and cellphones with a built-in camera.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2008-186942 filed on Jul. 18, 2008, and No. 2009-166662 filed on Jul. 15, 2009, the entire contents of which are hereby incorporated by reference.

What is claimed is:

1. An image capture device comprising:
   an optical system for producing a subject's image;
   an imager with multiple photodiodes, the imager reading from the photodiode an electrical signal representing an intensity of light that has been incident on the multiple photodiodes, thereby generating an image signal representing the subject's image;
   a controller, which acquires sensitivity information by photometry in order to adjust sensitivity of the imager to light and which selects a reading method from multiple methods for reading the electrical signal from the multiple photodiodes according to the sensitivity information acquired; and
   a driver for driving the imager according to the reading method selected,
   wherein the multiple reading methods include a mixing reading method, by which the electrical signals supplied from the photodiodes are added together and then output, and
   wherein the multiple reading methods include a standard reading method, by which the electrical signals supplied from the respective photodiodes are output without being added together, and
   wherein the controller selects either the standard reading method or the mixing reading method, and
   the respective numbers of pixels of the image signals generated by the standard and mixing reading methods are equal to each other.

2. The image capture device of claim 1, further comprising an amplifier for amplifying the image signal generated with a set of amplification gains,
   wherein the controller sets one of the amplification gains according to the sensitivity information acquired, and
   wherein after one of the amplification gains has been set, the driver drives the imager, thereby getting the image signal generated by the imager.

3. The image capture device of claim 1, further comprising an image processor for performing image compression or expansion on the image signal that has been amplified,
   wherein the image processor performs the image compression to cut down the number of pixels of the image signal generated by the standard reading method to that of the image signal generated by the mixing reading method.

4. The image capture device of claim 1, further comprising an image processor for performing image compression or expansion by means of interpolation on the image signal that has been amplified,
   wherein if the image signal has been generated by the standard reading method, the image processor performs the image compression to cut down the number of pixels of the image signal, but if the image signal has been generated by the mixing reading method, the image processor performs the interpolation on the image signal to increase its number of pixels.

5. The image capture device of claim 1, further comprising a flash operable to fire in order to ensure sufficient light for shooting,
   wherein if shooting sessions need to be sequentially performed a number of times with the flash fired,
   the controller performs photometry with the flash fired preliminarily before the shooting sessions are started, thereby acquiring the sensitivity information, and selects either the standard reading method or the mixing reading method according to the sensitivity information acquired.

6. The image capture device of claim 1, wherein the controller selects the mixing reading method if the sensitivity information is equal to or greater than a threshold value but selects the standard reading method if the sensitivity information is less than the threshold value.

7. The image capture device of claim 1, wherein only when the image capture device is instructed to operate in a particular mode, the controller determines, according to the sensitivity information acquired, which of multiple reading methods should be taken to read the electrical signal from the multiple photodiodes.

* * * * *